United States Patent [19]

Martin

[11] Patent Number: 5,336,864
[45] Date of Patent: Aug. 9, 1994

[54] PULSES GENERATOR FOR ELECTRODISCHARGE MACHINING

[75] Inventor: Roland Martin, Bloux-Dingy-en-Vuache, France

[73] Assignee: Charmilles Technologies SA, Switzerland

[21] Appl. No.: 891,795

[22] Filed: Jun. 1, 1992

[30] Foreign Application Priority Data

Jun. 1, 1991 [CH] Switzerland ............ 01624/91

[51] Int. Cl.⁵ ................................ B23H 1/02
[52] U.S. Cl. ........................ 219/69.18; 219/69.13
[58] Field of Search ........................ 219/69.13, 69.18

[56] References Cited

U.S. PATENT DOCUMENTS

| | | | |
|---|---|---|---|
| 3,832,510 | 8/1974 | Pfau et al. | 219/69.13 |
| 4,237,370 | 12/1980 | Ullmann | 219/69.18 |
| 4,443,682 | 4/1984 | Ho | 219/69.13 |
| 4,713,516 | 12/1987 | Bühler et al. | 219/69.18 |
| 4,788,399 | 11/1988 | Mironoff | 219/69.18 |
| 5,083,001 | 1/1992 | Kinbara et al. | 219/69.18 |

FOREIGN PATENT DOCUMENTS

| | | |
|---|---|---|
| 2189936 | 1/1974 | France . |
| 6018072 | 9/1985 | Japan . |
| 644290 | 7/1984 | Switzerland . |

*Primary Examiner*—Geoffrey S. Evans
*Attorney, Agent, or Firm*—Gifford, Groh, Sprinkle, Patmore and Anderson

[57] ABSTRACT

An electrical discharge machining system including a controlled pulse generator providing high energy pulses having a central system for continuously controlling the energy level, the duration and the frequency of the pulses.

7 Claims, 10 Drawing Sheets

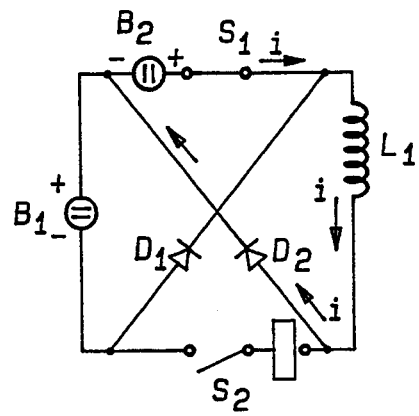
Fig-1b
PRIOR ART
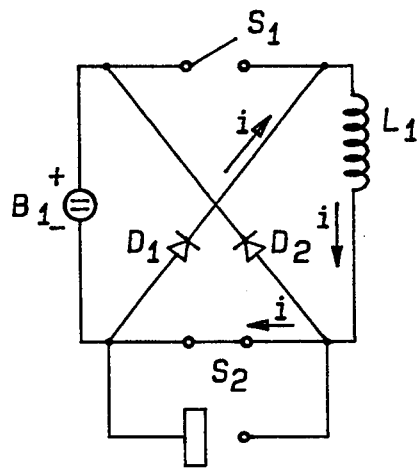
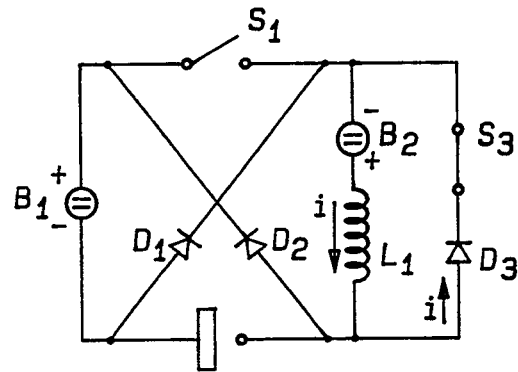
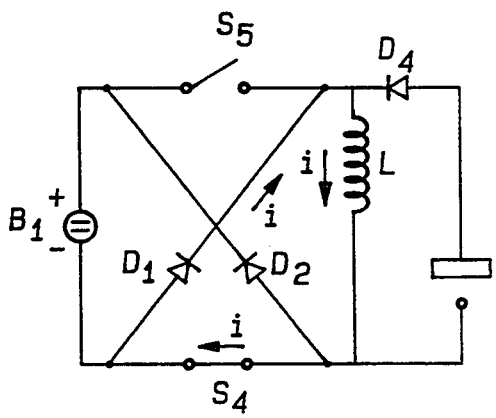
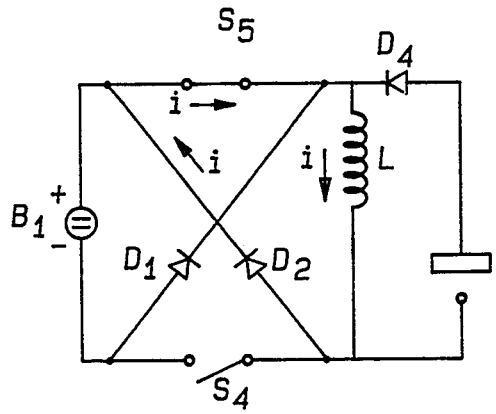

PULSES GENERATOR FOR ELECTRODISCHARGE MACHINING

This invention deals with a controlled pulses generator for machining by intermittent electrical discharges (or spark erosion) which renders possible the emission of pulses with high energy efficiency, the continuous adjustment of their energy level and the control of their duration and frequency.

It is well known, particularly from the applicant's patents, CH 377 951 and CH 563 835, that the dispersal of power in resistors can be avoided by applying all of the power of a direct current power source of an electric discharge generator to an energy storage device which then returns it to the machining area, instead of restricting the output of said power source by resistors connected in series to the electrodes. (See FIG. 1a corresponding to FIG. 6 of CH 377 951 and FIGS. 1, 4, 5 and 6 of CH 563 835, respectively).

With the aid of the device described in patent CH 563 835, the current flowing in this storage device can be maintained at a predetermined value and the restoration is effected through pulses of controlled frequency and duration, owing to the possibility of transmitting the energy of the storage device along voltage circuit, preferably of low impedance. (See FIG. 1b corresponding to FIGS. 1, 4, 5 and 6 of CH 563 835, in which the current i restored by the storage device L1 flows across a diode and a line breaker).

In some variants of the devices described in the above-mentioned patents, the storage device can even restore some of the energy to the power source by means of a recovery circuit in which the current restored by the storage device flows through said source in an opposite direction to that of the current supplied by said power source.

In case the machining area is connected in the recovery circuit, the decrease in the machining current is very rapid owing to its transmission through the source in the opposite direction, since the voltage of the former is in conflict with that of the storage device; hence the designation, "well" given to this type of circuit. The discharge current may be very intense and the duration of the discharges, short (See FIG. 1c corresponding to FIG. 6 of CH 377 951).

When the machining area is not connected in the recovery circuit, the termination of the pulse of current in the machining area does not necessarily coincide with the moment when the storage device has exhausted all the stored energy. The restoration takes place in the time interval separating two successive pulses; the current restored by the storage device being shunted into the recovery circuit simultaneously to the break in the machining circuit. (see FIG. 1d corresponding to FIG. 7 of CH 563 835)

Compared to a circuit with resistors in series, the power which has to be supplied in these types of circuits may be reduced by a factor greater than three. Another of their advantages is their ability to maintain the level of the current pulses continuously constant, even if the source voltage varies as a result of fluctuations in the power supply network.

It is also known that, in order to increase the performance of a pulses generator, an auxiliary striking source of low intensity is used to trigger its discharge and to make circuit with the actual power source only after the build up of a discharge has been detected. We may refer to the controlled pulses generator with two sources, each linked to an energy storage device and connected in parallel to the machining area, illustrated in FIG. 7 of CH 563 835, or the generator with a relaxation auxiliary striking source also connected in parallel, described in applicant's patent CH 644 290. In the circuits described in patent CH 563 835 mentioned above, the amplitude of the machining current is maintained at one or more predetermined values. On the contrary it may be advantageous to control with the device described in patent CH 644 290, the amplitude of the current of each discharge according to the duration of its striking while maintaining its duration at a predetermined value. We may recall that, although the variation of the amplitude according to its striking delay is automatic in relaxation generators, the above-mentioned device alone enables it to be achieved with a controlled pulses generator.

However, the energy efficiency of the existing pulses generators for spark erosion is still inadequate, because most of the energy provided by the power source accumulates by inductivity, particularly in the machining line (line self-induction), above all in the power source and therefore, cannot be consumed by machining. It would be very advantageous to be able to return, at least a part of this energy to the power source.

The purpose of this invention is therefore to provide a controlled pulses generator which combines the advantages of the two kinds of circuits mentioned above (high energy efficiency and control of the amplitude of the machining current and of the duration and frequency of the discharges) by using an auxiliary striking source and circuits which recover the energy not consumed in machining and which is insensitive to the fluctuations in the power supply network, with the aid of an original method of supply which has the major advantage to require only a single voltage regulation.

This has been achieved by the generators of this invention, which are designed to recover the energy dissipated in the self-induction of the line and in which a high output power source of current can supply the machining area between the electrodes at high frequency, with controlled, short, steep pulses of current of large amplitude and in which the energy accumulated by inductivity in the machining line is restored to the machining area, particularly during the time intervals separating two successive pulses emitted by the high output power source. They are characterized by an intermediate source connected in series with the electrode-tool and the workpiece to be machined, in a circuit referred to as "recovery circuit" and by means for returning his energy from this intermediate source to the high power source.

"Recovery circuit" means a circuit laid out so that the energy restoring current supplied by the energy accumulated by inductivity in the machining line, known as the "line self-induction" flows through a source in an opposite direction to that of the current supplied by said source.

The replacement of the resistances in series with the power source by self-induction coils arranged according to one of the diagrams in CH 563 835, so as to transform said power source into a controlled pulses generator with energy storage device, has already been suggested in CH 644 290. In the resultant generator which would thus be obtained, the machining area would never be in series with a source in a circuit and would never, contrarily to the generators of this invention, be crossed by a recovery current which returns to a source the energy accumulated in the line self-induction by means of a "well" circuit.

The generators of this invention differ from existing circuits in the following respects:
- the energy accumulated by inductivity in the machining line is restored to an intermediate (or secondary) source and not directly to a striking source distinct from this intermediate source or to source supplying energy in the machining area (principal or high output or power source);
- they include a booster voltage circuit with a voltage stabilizer connected between these two sources, enabling the energy in the intermediate source to be stored and then returned, at will, to the principal power source (and, if necessary, also to a striking source distinct from this intermediate source)
- the sources supplying the machining area (principal source and possibly striking source) are only supplied by the intermediate source alone and it is this source which is alone linked to the power supply network.
- the principal source no longer includes a regulator. A regulator stabilizing the recovered voltage is integrated into the intermediate source which provides said principal source only with the energy required; furthermore, the output level of the principal source is controlled by the line self-induction.

Other differences between the generators of this invention and existing generators will be outlined later.

The attached diagram will point out various technical aspects of the state of art and by way of example, represent schematically several embodiments of generators according to the present invention.

FIGS. 1a to 1d illustrate various existing circuits mentioned in the introduction.

FIG. 2 outlines a first embodiment of a generator according to the present invention, in which the striking source and the high output source are fed by the same intermediate source linked to the network.

Figure 2:
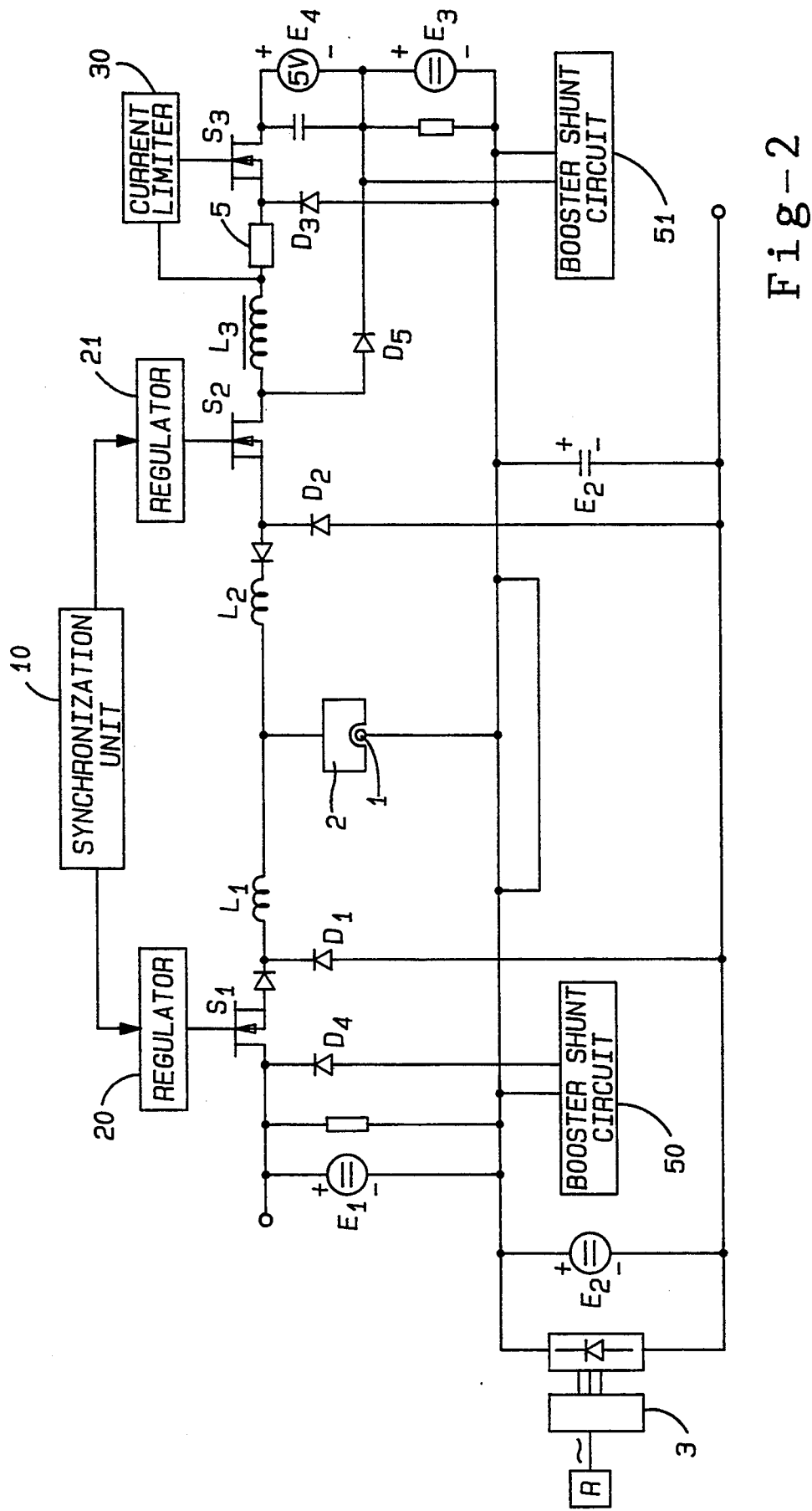
Figure 7:
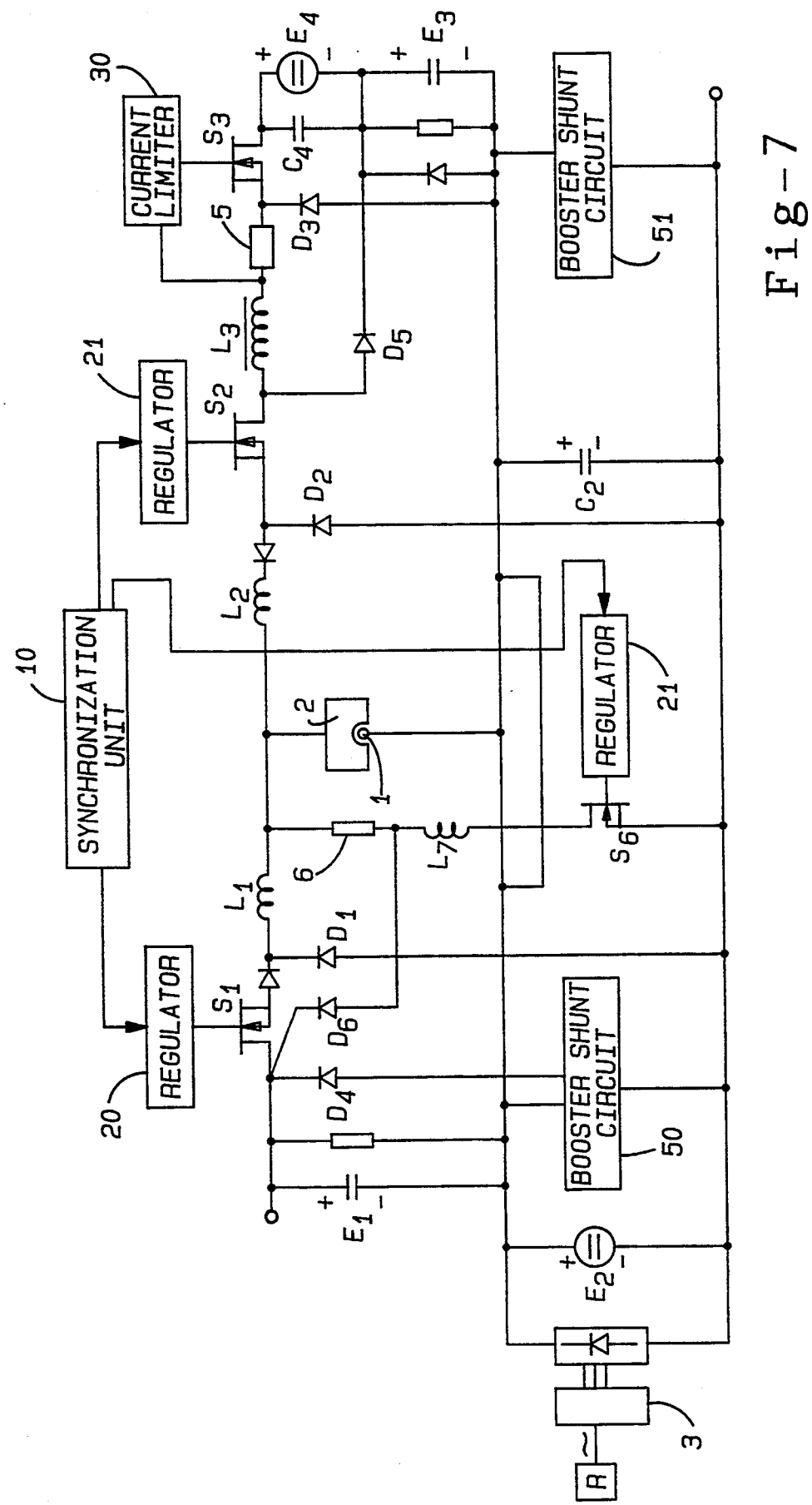

FIG. 7 outlines a first variant of the "well" circuit illustrated in FIG. 2.

Figure 8:
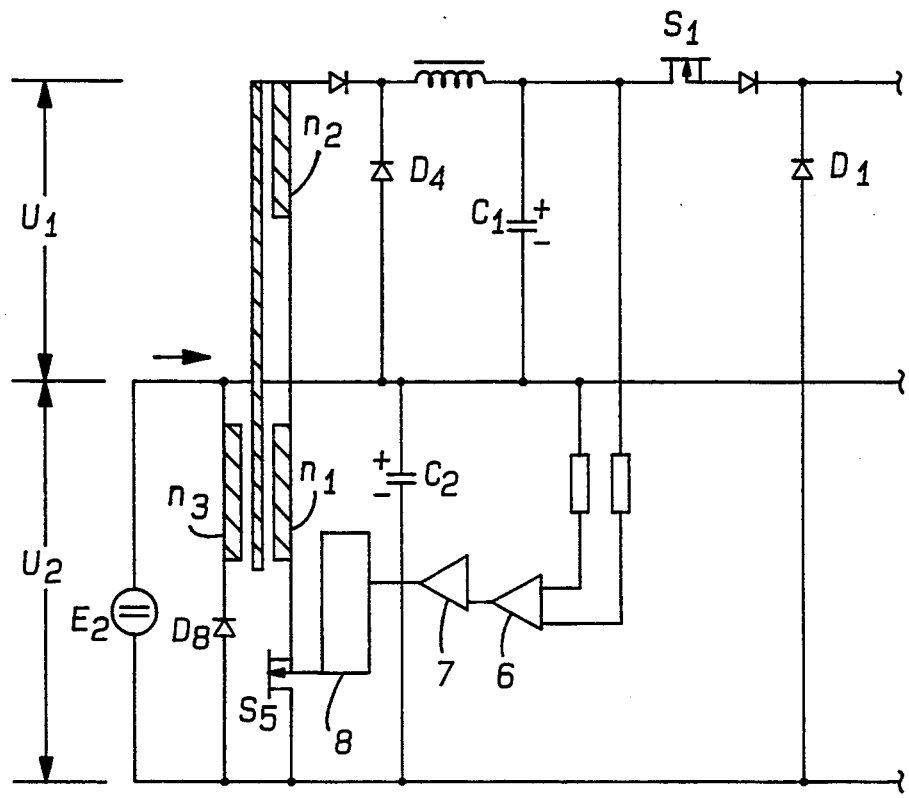

FIG. 8 outlines a second variant of the "well" circuit illustrated in FIG. 2.

Figure 9:
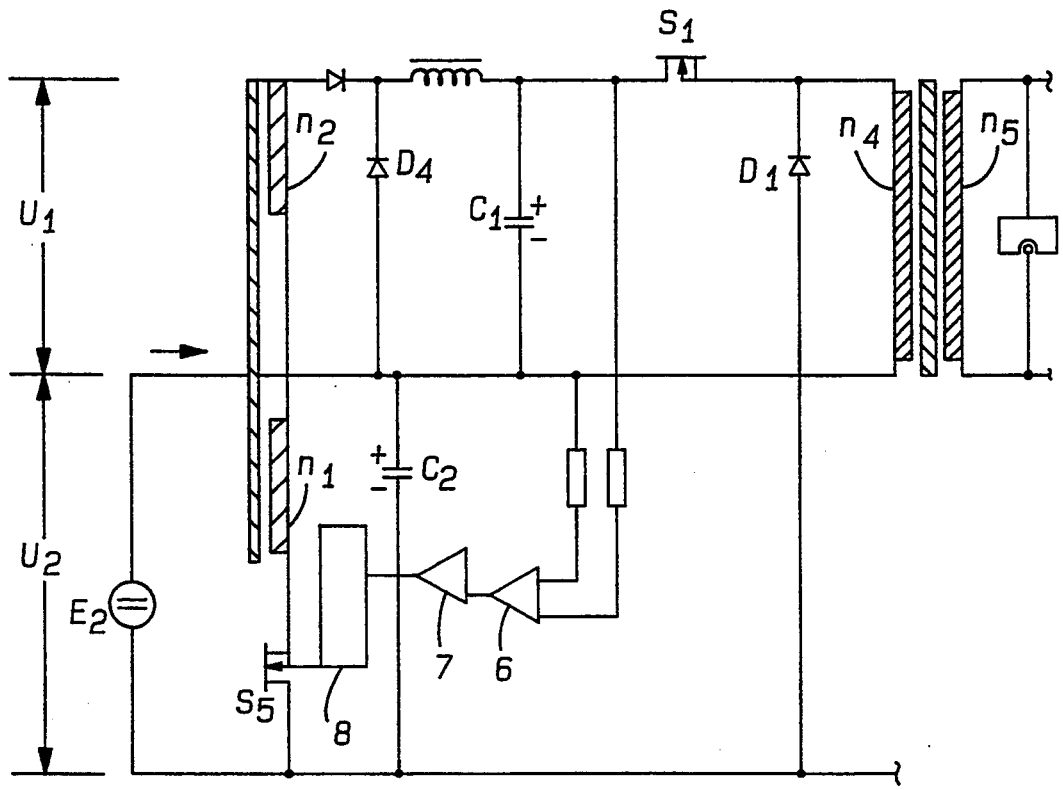

FIG. 9 outlines a third variant of the "well" circuit illustrated in FIG. 2.

Figure 10A:
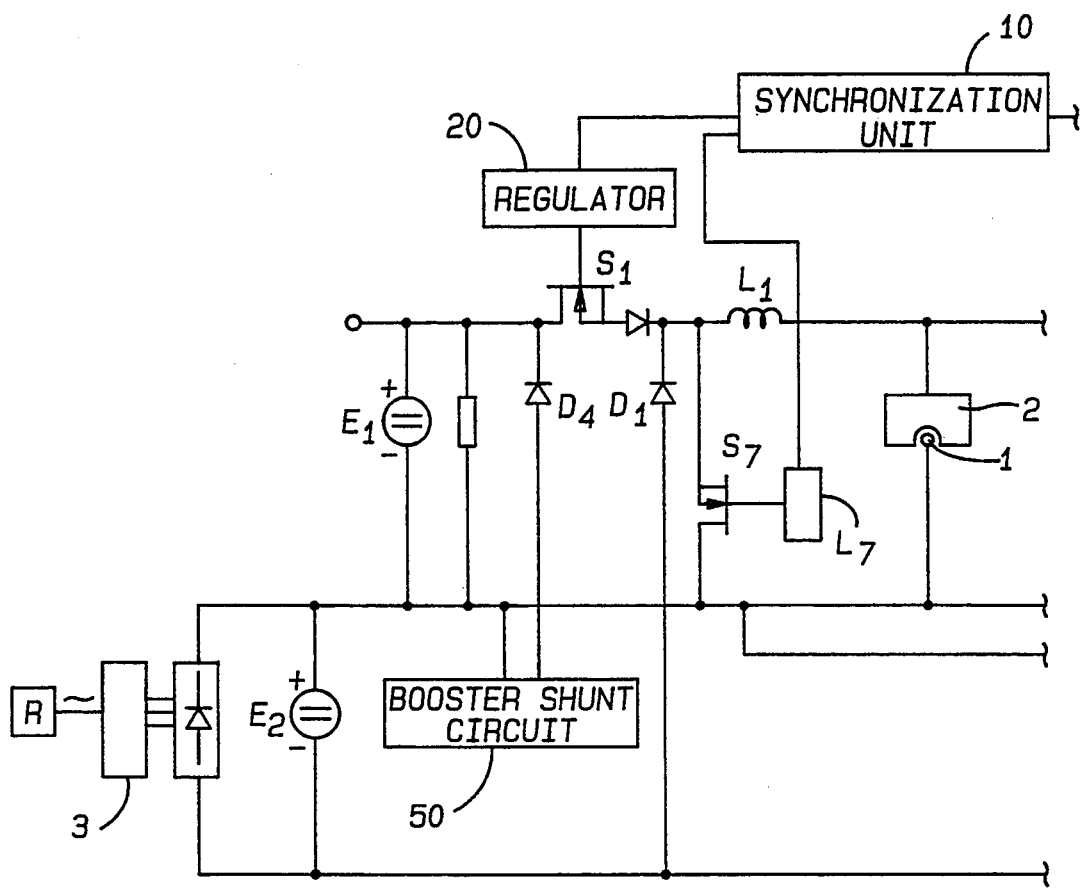

FIG. 10a outlines another variant of the circuit with intermediate source as illustrated in FIG. 2.

Figure 10B:
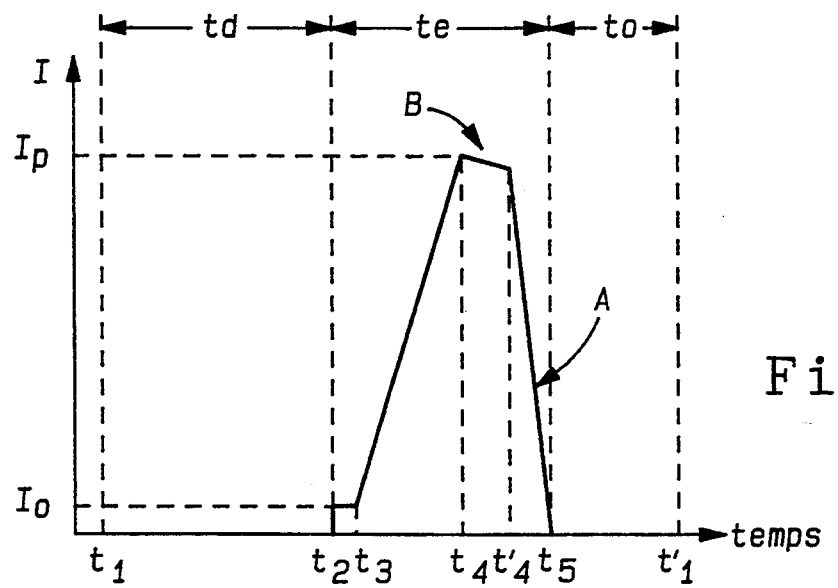

FIG. 10b illustrates the profile of current pulses corresponding to the circuit, illustrated in FIG. 10a.

Known circuits illustrated by the schemes 1a to 1d in FIG. 1 are all comprised of:
- a source E (designated (a,b) in CH 377 951 and B1 in CH 563 835)
- two line breakers S1 and S2 (designated as 12 and 13 in CH 377 951 and S1, S2 or S4, S5 in CH 563 835)
- two diodes D1 and D2 (designated as 14 and 15 in CH 377 951 and D1 and D2 in CH 563 835) and
- an energy storage device L (the self-induction coil designated as 1 in CH 377 951 and as L1 in CH 563 835).

The line-breaker S1 is located in branch AB and the self-induction coil L in branch BC, while the second line-breaker S2 is located either in branch CD or in parallel with L. The electrodes may be in series with L in the branch BC, in series or in parallel with S2 in the branch CD, or in branch CD when S2 is in parallel with L, or in parallel with L when S2 is in branch CD.

Figure 1A:
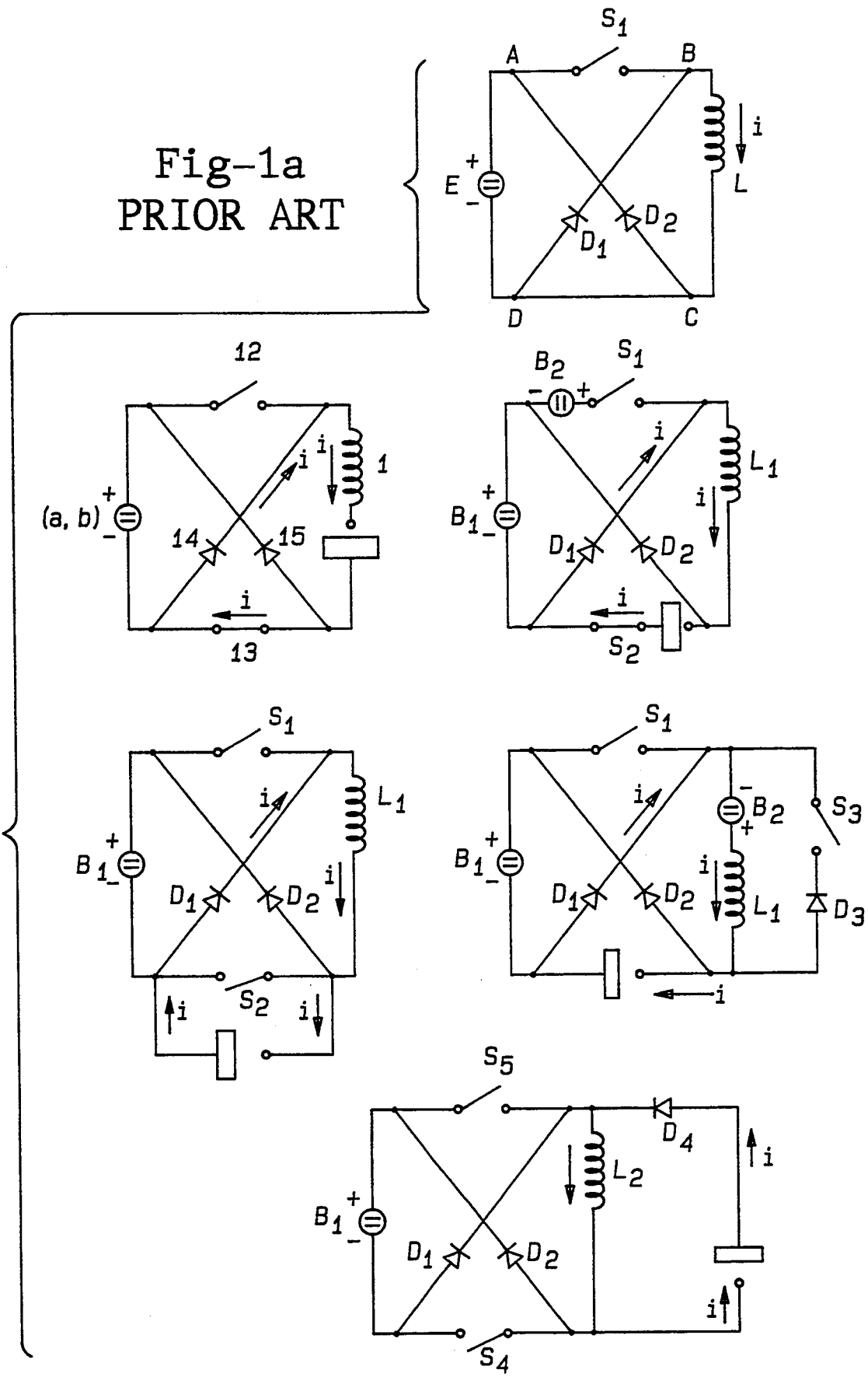

In a first state of the two line breakers, the energy stored in L is transferred between the electrodes (FIG. 1a).

In a second state of the two line breakers, the energy from the storage device is transmitted to a voltage circuit while no current passes between the electrodes (FIG. 1b).

Figure 1C:
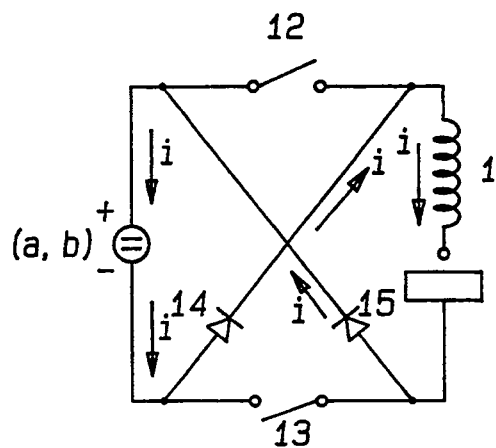

In a third state of the two line breakers, the current restored by the storage device at the power source flows through said power source in an opposite direction to that of the current supplied by said source. The machining area is connected in that recovery circuit; it is indeed a "well" circuit (FIG. 1c).

Figure 1D:
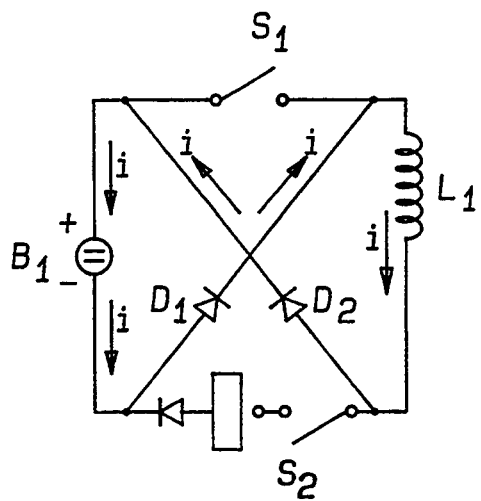

In the fourth state of the two line breakers, the current restored by the storage device at the power source flows, as above, through said power source in an opposite direction to that of the current supplied by said source. The machining area is not connected in that recovery circuit (FIG. 1d).

The generator according to the present invention and represented in FIG. 2 comprises an intermediate source E2 linked to the network R and connected in series with the machining area, that is the space between the electrode-tool or the wire 1 and the workpiece to be machined 2 in two "well" type recovery circuits, as well as a striking (or firing or triggering ) source E3 connected in parallel with a power source E1 capable of supplying high intensity pulses of current to the machining area.

The sources E1 and E3 are not linked directly to the network but to booster voltage circuits 50, respectively 51 (described later), inserted between each of them and the intermediate source E2. They may be made up by sufficiently powerful capacitances. They are held at a predetermined voltage by a stabilizer connected between them and the intermediate source as explained with reference to FIG. 5.

The supply of the intermediate source E2 is effected from a three phase transformer 3 of some kilovolt amperes; it is made up of a primary coil with a voltage of several hundred volts and a secondary coil which can supply a current of several tens of amperes under sufficient voltage, after rectification in a three phase bridge. It includes a supplementary secondary coil intended for the auxiliary source E4 of the striking source E3; E4 is a low voltage source, suitable for the limitation circuit, the role of which will be explained later. Nevertheless, E1 is the source of power because the circuits of the generator in this invention are arranged so that the voltage between the terminals of E1 is very much greater than that of the intermediate source E2 (for example 200 V and 100 V, respectively.)

As for the generators described in CH 644 290, the generator according to the present invention allows to trigger at low voltage from sources E1 and E3, then to use high voltage to increase the current very rapidly, thereby obtaining short, steep and intense pulses, favorable, for example for wire cutting. It includes a synchronization unit 10, which detects the striking, sets to, the pulse interval time between two voltage pulses and tr, the minimum time separating the beginning of the voltage pulse of the switching on of the power source E1. It also includes a regulator 20 measuring the striking period td and adjusting the maximum amplitude of the pulse of current emitted by the power source E1 (peak current) as a function of said striking period.

However, the striking source E3 is no longer a relaxation circuit but a controlled pulses circuit. It is connected in a circuit similar to that represented in FIG. 1 of CH 563 835, comprising a self induction coil L3, a resistor 5 and a current limiter 30 capable of maintaining the flow of current in said coil L3 at a predetermined intensity by controlling a line breaker S3 connected in series before this coil L3. Two diodes, D3 and D5, and an auxiliary source E4 are also provided in this circuit. The operation of the latter will be explained later.

Each of the sources E2 and E4 includes a capacitance C2 and C4 respectively, arranged in parallel with the terminals of the corresponding source. The source E1 supplies the energy instantaneously during the ascent of the current pulse, whereas the capacitance C2 instantaneously accumulates the energy recovered from the machining line during the descent of this pulse. These capacitances are also designed to recover the energy returned by the various energy storage devices of the generator.

Figure 6:
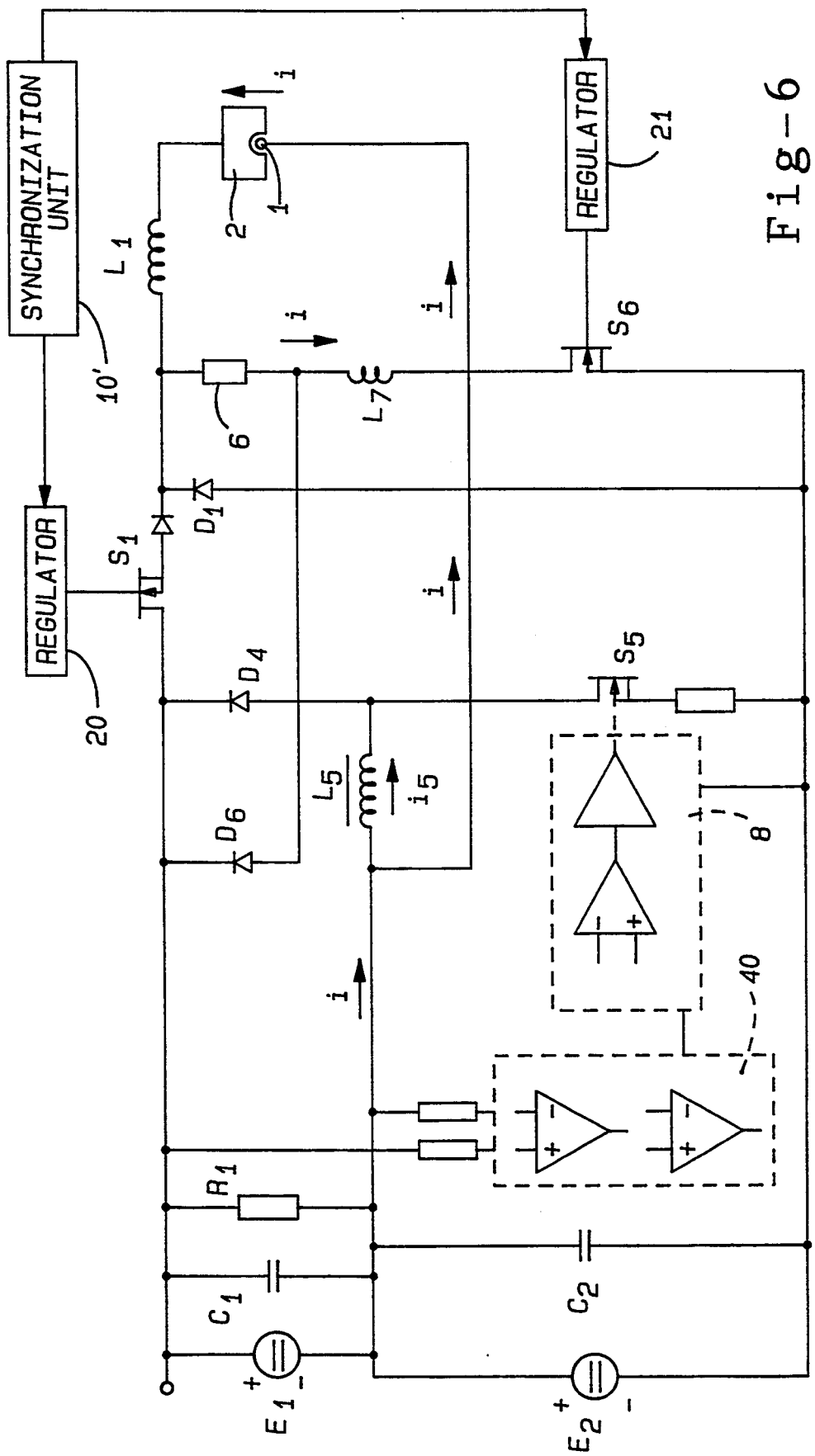
FIG. 6 represents another form of construction of a generator according to this invention in which the intermediate source linked to the network also assumes the role of the striking source.

The intermediate source E2 is organized into two "well" circuits which function in a similar way to the "well" circuits described in FIG. 6 of CH 377 951 (comprising two synchronized line breaking devices and two unidirectional conductors); but they include only one line breaker, the transistor S1, respectively S2, and a single unidirectional conductor element, the diode D1, respectively D2. By closing the transistor S1, respectively S2, the current supplied from source E1, respectively E3, flows in series through the line self-induction L1, respectively L2, and the space between the electrodes. This current does not flow through the diode D1, respectively D2, the polarity of which is inverse. On the other hand, when the supply currents are interrupted as a result of the opening of the line breakers S1 and S2, the energy accumulated in the line self-inductions L1 and L2 is recovered and a recovery current flows in the circuits made up of the line-self L1, the electrodes, the intermediate source E2 and the diode D1 and, respectively, of the line-self L2, the electrodes, the intermediate source E2 and the diode D2. These diodes D1 and D2 are connected in such a way that the recovery current must flow through the source E2 in the opposite direction to that of the current supplied by said intermediate source.

Thus for example, in the case of a roughing cutting operation undertaken with a wire-electrode at the rate of 300 mm 2/mn with power in the order of 3,000 W, supplied from the network, approximately 2,000 W were recovered by the intermediate source E2 from the wells channelling the energy which has been accumulated in the lines linked to the power source E1. Thus approximately 5,000 W could be transferred to the power source E1, of which more than a third had been recovered. It should be added that approximately 1,700 W were consumed in machining which is less than the power recovered.

The supply of current pulses in the area between the electrodes will also be described with reference to FIGS. 3a and 3b. It is divided into four stages:

a striking phase (from moment t1 to moment t3) in which the striking source E3 is switched on at the moment t1 by closing the line breaker component S2; a voltage U1 is produced between the electrodes, adjustable between 80 and 200 V, for example. At the end of the striking period of random duration td, a discharge bursts out (at the moment t2) and the striking source E3 provides a discharge current of value Io determined by E3 in the striking circuit, while the voltage between the electrodes falls to the value Ue. This current Io is of the order of 1 to 16 A, for example. This circuit comprises the line breaker S2, the line self-induction L2 and the electrodes 2 and 1 in series. The discharge current does not flow through the diodes D2 and D3, the polarity of which is inverse. This striking is detected by the unit of synchronization 10 which memorizes the striking period td, adjusts the power supplied as a function of td and switches off the power supply E1 by closing the circuit line breaklet S1 at the moment t3;

a first machining step (from moment t3 to moment t4) during which the amplitude of the current pulse increases up to the peak value Ip (as a function of td) as a result of the supply of a current of high intensity in the power supply circuit. The latter comprises the source E1, the transistor S1, the line self induction L1, the electrodes 2 and 1. This current does not cross the diodes D1 and D4 the polarity of which is inverse. The value of Ip may vary from 50A to several hundred amperes, for example. The two sources E1 and E3 are maintained switched on for a period of time te, independently of the value of Ip and set by unit 10; a significant proportion of the power supplied by sources E1 and E3 is stored in the storage device of the circuit, particularly in the line self-inductions L1 and L2, while a smaller proportion is consumed between the electrodes.

a second machining step (from moment t4 to moment t5); at t4 the two sources E1 and E3 are cut by opening the line breakers S1 and S2. From this time on, a recovery current is established in the diodes D1 and D2 and between the electrodes through the intermediate source E2, in an opposite direction to that of the current supplied by said intermediate source. As the voltage of the source E2 runs against that of the line self-inductions L1 and L2, the current decreases abruptly from Ip until it dissipates completely (at moment t5) according to a slope fixed as a function of the value of Ip and the period t5−t4;

a break interval (from moment t5 to moment t0') during which E1 and E2 are kept off circuit.

Figure 3A:
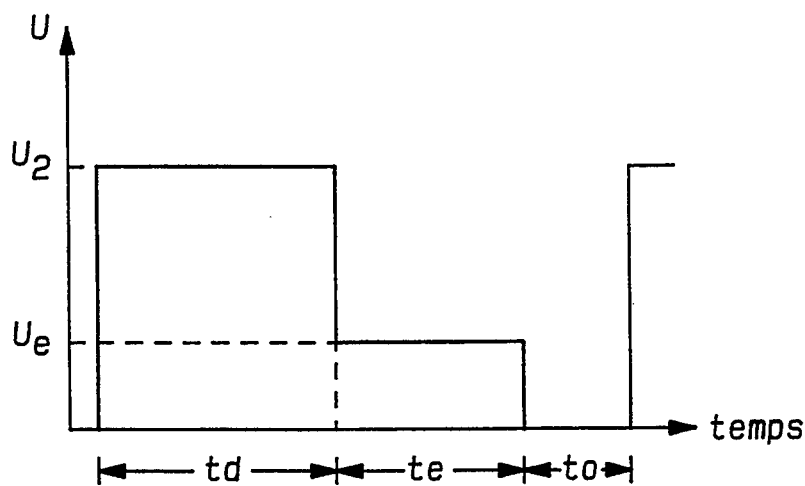
FIGS. 3a and 3b illustrate the profile of the voltage pulses and of the pulses of current appearing between the electrodes in the machining area of the circuit according to FIG. 2.
Figure 3B:
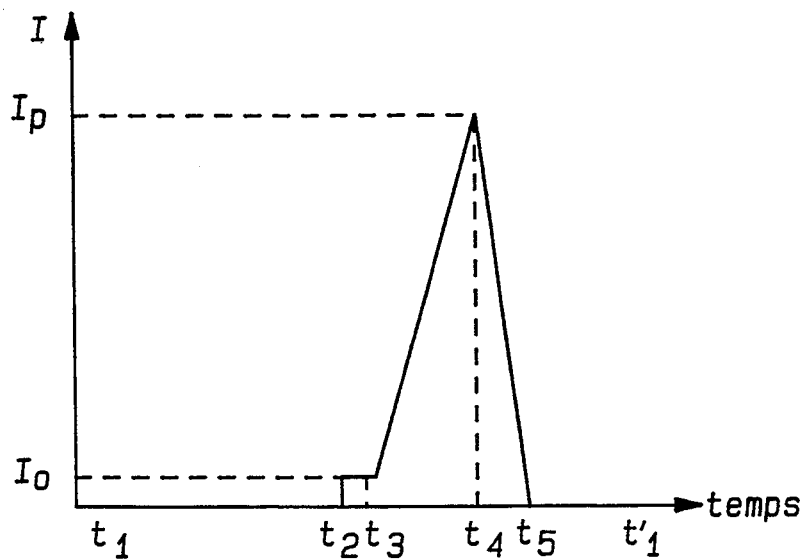

Pulses of current, appreciably triangular of great amplitude with steep ascents and descents, are obtained for the duration re, as represented by FIG. 3a.

Figure 4:
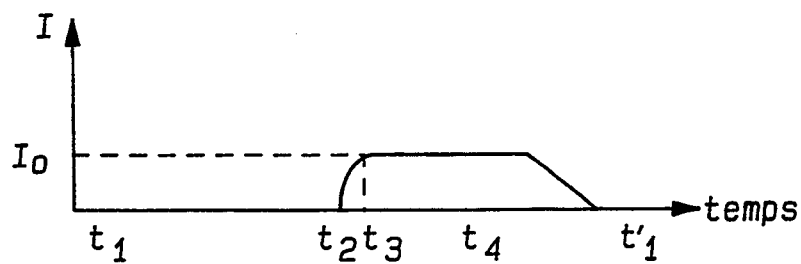
FIG. 4 illustrates the profile of finishing pulses.

Moreover, this generator may also operate as a finishing generator by using only the striking source E3 and in putting the power source E1 off circuit. It is known that pulses with steep leading edges are not desirable on finishing. Also, rather than returning the energy stored in the line self-induction L2 to the intermediate source E2 at the end of each pulse of current by opening the line breaker S2, causing thus the recovery current to flow through said intermediate source in an opposite direction to that of the current supplied by said source and therefore to decrease rapidly between the electrodes, the transistor S3 is opened by maintaining the line breaker S2 conductor. The supply through source E3 (and by the auxiliary source E4) is interrupted, while a current returning the energy stored in the line self-inductions L2 and in coil L3 to the area between the electrodes flows through the line breaker S2, then between these electrodes and finally through the diode D3, while diminishing slowly. This is is illustrated in FIG. 4 where:

from moment t2 to moment t4: the line breaker S2 and the transistor S3 are conductors;

from moment t4 to moment t1': the transistor S3 is opened. A trapezoidal pulse of current, of slow ascent and descent, is thereby obtained.

It should be remarked that when the transistor S3 is closed while S2 is open, the auxiliary source E4 flows into the self induction coil L3, across the transistor S3 and the resistor 5; the current which flows across this coil L3 increases up to a predetermined value set by the current limiter 30 which then activates the transistor S3.

Figure 5:
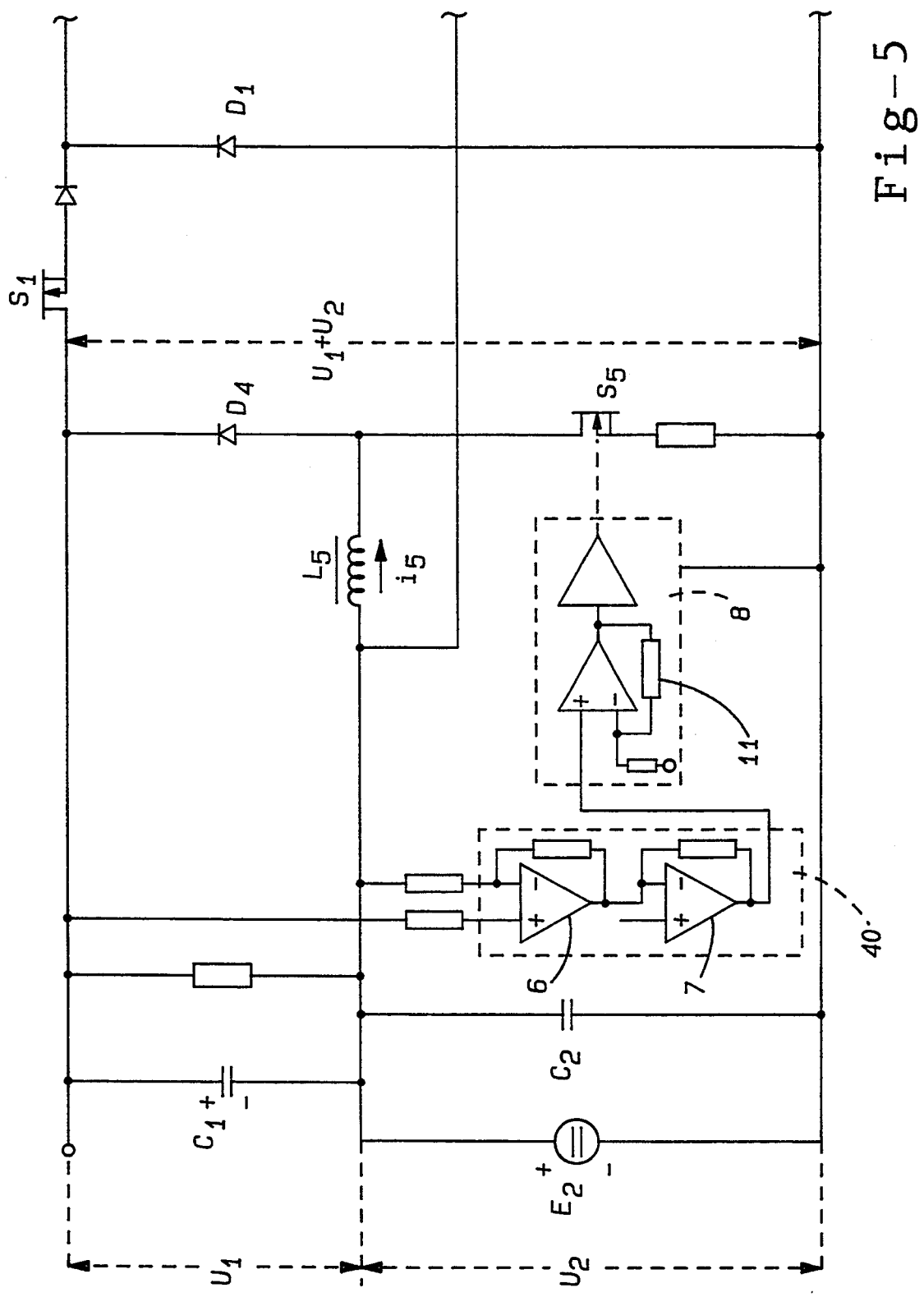
FIG. 5 represents the booster voltage circuit inserted between the intermediate source of the recovery circuit and the source(s) of the machining circuit.

FIG. 5 shows one embodiment of the booster voltage circuit 50 which renders possible the transfer of energy from the intermediate source E2 to the power source E1. The same references as in FIG. 2 are used to indicate the same components. It can similarly be found the diode D1 and the line breaker S1.

Circuit 50 consists of a voltage regulator or stabilizer 40 which allows the capacitance C1 to remain charged at a predetermined voltage U1 (in this example, between 170 and 200 V ) and an actual booster voltage circuit, comprising a self-induction coil L5, means to compare the current i5 flowing through this coil L5 at two larger and smaller reference values and means to activate a line breaker after a signal has indicated that the current i5 has attained one of the reference values.

In the embodiment illustrated by this figure, the booster voltage circuit comprises a self induction coil L5, a cut-off current regulator 8 with cyclic ratio modulation arranged to activate a transistor S5, a capacitance C1 and a diode D4.

The voltage U2 at the terminals of the intermediate source E2 is raised up to a predetermined voltage U1, in accordance with the following principle;

the current i5 flowing in the self-induction coil L5 is kept between two limits with a current regulator 8 and a transistor S5. This regulator 8 is set up to follow the variations of the current i5 between two reference values i51 and i52 and to control the opening of S5 as soon as i5 reaches the maximum limit i52 and its closing as soon as i5 attains the minimum limit i51.

When the transistor S5 is closed, the energy emitted by the intermediary source E2 accumulates in the coil L5 while prompting an increase in current i5 which flows into L5, the transistor S5 and returns to source E2.

At the end of the time t1, the current i5 attains the value i52 and the regulator 8 opens the transistor S5; the diode D4 is connected in such a way that the energy accumulated in L5 must be restored across this diode at the capacitance C1; the current i5 decreases until reaching the minimum i51 at the end of the time t2 where the regulator 8 closes the transistor S5 and the cycle repeats itself.

If U2 is the voltage of the capacitor C2, it can be seen that:

$$\frac{U1 + U2}{U2} = \frac{t1 + t2}{t2} \text{ or } U1 = U2\frac{t1}{t2}$$

Thus, if U2=80 V, and for example ti/t2=5/2, one will have U1=200 V.

The voltage U1 "created" as explained above, is regulated at a predetermined value according to the following principle:

differential amplifiers 6 and 7 connected to the terminals of the power source E1, the stabilizer 40 detects any variation in the difference in potential between the terminals of this power source E1 as a result of a surge in current, for example, and controls the times t1 and t2 of opening and closing of transistor S5 so as to restore the difference in potential to the predetermined value U1.

A second circuit 51 of the same type may be used to supply the striking source E3 from E2.

The intermediate source E2 linked to the network may also serve as a striking source. FIG. 6 illustrates one of the modes for building up such a circuit. It can serve as a well, because it is capable of recovering the energy of the line self inductance L1, as a stabilizer and booster voltage circuit since it is constructed to transfer this energy to the power source E1, and as a striking source.

The same references as for FIG. 2 and 5 are used to indicate the same components. One thus finds the electrodes 1 and 2, the diodes D1 and D4, the line breakers S1 and S5, the coil L5, the voltage stabilizer 40 and the regulator 8.

Owing to the switch S6, the diode D6 and the limiter 6, one can connect firstly the source E2 to the electrodes by switching off the line breaker S6. the line breaker S1 remaining open; a striking current i of inverse polarity is then supplied between the electrodes from E2. A line self-induction L7 is created. A synchronizing unit 10 is connected to pilot circuits 20 and 21 of S1, respectively S6, and activates these line breakers as described in reference to FIG. 2 for S1 and S2.

Diode D6 enables the source E1 to recover the energy stored in the limiter 6. This component 6 can, for example, be an inductor or a resistor of any known kind; the ballast resistor R1 is intended to disperse the surplus energy.

According to various ways to carrying up the present invention, the synchronization unit 10' may be included in unit 10; the part of the circuit comprising the limiter 6 and the line breaker S6 in series may be connected between S1 and L1, as shown in FIG. 6, but also between L1 or L2 and the inter-electrode area.

According to another advantageous variant of this circuit, where a current of opposite polarity may be supplied by the intermediate source E2, a distinct striking source E3 is maintained. This is illustrated in FIG. 7 where the same references as for FIGS. 2 and 6 are used to indicate the same components. The operation of switch S6, diode D6 and limiter 6 are the same as those described in reference to FIG. 6. As the switch S6 is closed while line breakers S1 and S2 are open, a surge of current pulses of opposite polarity coming from source E2 flows between the electrodes during the break interval between two successive pulses of the first polarity. The synchronization unit 10 may also be adjusted so that the average machining voltage over a period, or number of periods, is nil. In one variant, the switch S6 may be replaced by a linear regulator which polarizes the inter-electrode area continuously or for a predetermined period during the break interval. The synchronization unit 10 then adjusts the amplitude of the inverse voltage over a period or number of periods.

This embodiment of the present invention is particularly advantageous. Indeed, the anodic dissolution of sensitive components, such as cobalt bonded carbides, is avoided by the use of this bipolar source E2. Moreover, this striking by a positive current appears to stabilize the roughing machining with brass wire and to reduce the unwanted deposits.

In other advantageous embodiments of this invention, the self inductance L5 may be replaced by a transformer, as illustrated in FIGS. 8 and 9. The booster voltage circuit can be of the type of a direct, insulated converter, as showed on FIG. 8.

The same references as for FIG. 5 are used to indicate the same components. One thus finds the differential amplifiers 6 and 7 of the voltage regulator or stabilizer 40 which allows the capacitance C1 to remain charged at a predetermined voltage U1 such as the cut-off current regulator 8 with cyclic ratio modulation arranged to activate the transistor S5, a capacitance C1 and a diode D4.

The transistor S5 is connected in series with the coil n1 of a transformer which presents a demagnetizing coil n3; said coil n3, linked in series with a diode D8, is connected between the terminals of the source E2, in parallel with n1 and S5. A third coil n2 is connected between the terminals of the capacitance C1.

If U1 is the voltage of the capacitor C1 and U2 the voltage of the capacitor C2, it can be seen that:

$$\frac{U1}{U2} = \frac{n2}{n1} \cdot s$$

s being the cyclic ratio of S5 modulation.

The booster voltage circuit can also be of the not completely demagnetizable, insulated storage type, as showed on FIG. 9.

The same references as for FIG. 8 are used to indicate the same components. One thus finds the differential amplifiers 6 and 7 of the voltage regulator or stabilizer 40 which allows the capacitance C1 to remain charged at a predetermined voltage U1 such as the cut-off current regulator 8 with cyclic ratio modulation arranged to activate the transistor S5, a capacitance C1 and a diode D4.

As for FIG. 8, the transistor S5 is connected in series with the coil n1 of a transformer, between the terminals of the source E2, but said transformer does not present a demagnetizing coil.

A second coil n2 is connected between the terminals of the capacitance C1.

If U1 is the voltage of the capacitor C1 and U2 the voltage of the capacitor C2, it can be seen that:

$$\frac{U1}{U2} = \frac{n2}{n1} \cdot \frac{s}{1-s}$$

s being the cyclic ratio of S5 modulation.

These variants are particularly advantageous: they allow to build up "gratuitously" the auxiliary source E4 (see FIG. 2); by rendering no more necessary the ballast resistors (see resistor R1, for example, on FIGS. 2 and 5), they allow to save the energy which would be wasted therein.

As showed also on FIG. 9, according to given ways to carry out the present invention, a transformer with two coils n4 and n5 can be connected in parallel with the interelectrodes area and the power source E1, and, the case may be, with the striking source E3.

Following a last variant of the present invention, shown on FIG. 10a, a line-breaker S7 is connected in parallel with the interelectrodes area and the power source E1. It is activated by a regulator 27 which may be linked to the synchronization unit 10. This device allows to obtain current pulses with two different slopes for the current descent, as showed on FIG. 10b: part A correspond to the case where the line-breakers S1 and S7 are both open, whereas part B corresponds to the case where the line-breaker S1 is open and the line-breaker S7 closed.

In all these variants, the polarity of sources E2 and E1 can be inversed. If the polarity of other components is not also inverted, the level of energy is therefore reduced in transferring the energy from source E2 to source E1.

The generators according to the present invention display numerous advantages: they make possible the recovery of energy dispersed in the line self inductance thereby decreasing the power necessary for the performance of given tasks. Owing to their very economical topology, only two sources are required and only one of which must be regulated. One thereby obtains a generator which is much simpler, more efficient and less expansive than existing generators.

I claim:

1. A generator for machining by intermittent electrical discharges in which a high output power source of current is arranged to supply, at high frequency, a machining area between electrodes with short, steep and controlled pulses of large amplitude and in which energy accumulated by inductivity in a machining line is restored to the machining area during the time intervals separating two successive pulses emitted by the high power output source, characterized by an intermediate power source connected in series with an electrode-tool and a workpiece to be machined in a circuit constructed so that a recovery current, which is supplied by the energy accumulated by inductivity in the machining line, flows through said intermediate power source in an opposite direction to that of the current supplied by said intermediate power source, and means for returning said energy from said intermediate power source to said high power source, said means for returning the inductive energy comprises a modifying voltage circuit with a voltage stabilizer connected between the two power sources and arranged to effect recovery of the energy as a stabilized potential difference.

2. The generator according to claim 1, which also comprises a striking source of low intensity and a synchronizing unit to trigger the discharges and to switch on said high power source only after the build up of a discharge has been detected.

3. The generator according to claim 2, in which said intermediate power source supplies said striking source.

4. The generator according to claim 3, in which said intermediate power source is arranged so as to be connected with two different polarities to the electrodes.

5. The generator according to claim 2, in which said striking source comprises an auxiliary source of very weak power.

6. The generator as according to claim 5, in which only said intermediate power source is connected to a power supply network, whereby said high power source and said striking source are only fed current by said intermediate power source.

7. The generator according to claim 1, in which only a single potential difference stabilizer is used.

* * * * *